(12) United States Patent
Hu et al.

(10) Patent No.: US 10,393,968 B1
(45) Date of Patent: Aug. 27, 2019

(54) APPARATUS FOR OPTICAL SWITCHING WITH TRANSMISSIONAL AND REFLECTIVE POLARIZATION MODULATORS

(71) Applicant: Molex, LLC, Lisle, IL (US)

(72) Inventors: Gongjian Hu, Marina, CA (US); Lifu Gong, San Jose, CA (US); Yi Liao, San Jose, CA (US); Tian Zhu, Castro Valley, CA (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/031,716

(22) Filed: Jul. 10, 2018

(51) Int. Cl.
```
G02B 6/26      (2006.01)
G02B 6/35      (2006.01)
G02B 6/293     (2006.01)
G02B 6/27      (2006.01)
```

(52) U.S. Cl.
CPC .......... *G02B 6/3512* (2013.01); *G02B 6/272* (2013.01); *G02B 6/29383* (2013.01); *G02B 6/29395* (2013.01)

(58) Field of Classification Search
CPC .... G02B 6/3512; G02B 6/3546; G02B 6/356; G02B 6/357; G02B 6/3556; G02B 6/26
See application file for complete search history.

(56) References Cited

U.S. PATENT DOCUMENTS

| | | | |
|---|---|---|---|
| 7,397,980 B2 | 7/2008 | Frisken | |
| 7,492,986 B1 | 2/2009 | Kelly | |
| 7,499,608 B1 | 3/2009 | Kelly et al. | |
| 7,909,958 B2 | 3/2011 | Washburn et al. | |
| 8,233,794 B2 * | 7/2012 | Colbourne | H04J 14/0206 375/130 |
| 8,494,314 B2 * | 7/2013 | Studenkov | G02B 6/105 385/11 |
| 9,304,257 B2 | 4/2016 | Keyworth et al. | |
| 9,575,260 B2 | 2/2017 | Keyworth et al. | |

* cited by examiner

*Primary Examiner* — Jennifer Doan
(74) *Attorney, Agent, or Firm* — Molex, LLC

(57) ABSTRACT

A wavelength selective switch includes a plurality of optical ports, a polarization conditioning system, a dispersion system, and a switching system. The switching system includes at least one transmissive stage and a reflective polarization modulator. Each transmissive stage has a transmissional polarization modulator and a symmetrical beam polarization separator. The transmissional polarization modulator includes transmissive first cells each being configured to change a polarization orientation of an optical beam passing through the cell. The symmetrical beam polarization separator is configured to redirect the optical beam passing therethrough based upon its polarization. The reflective polarization modulator includes a birefringence section and a reflective section. The birefringence section includes controllable second cells each being configured to convert linear polarization of an optical beam passing therethrough to circular polarization and to independently and selectively convert circular polarization of the optical beam passing through the second cell to linear polarization.

20 Claims, 13 Drawing Sheets

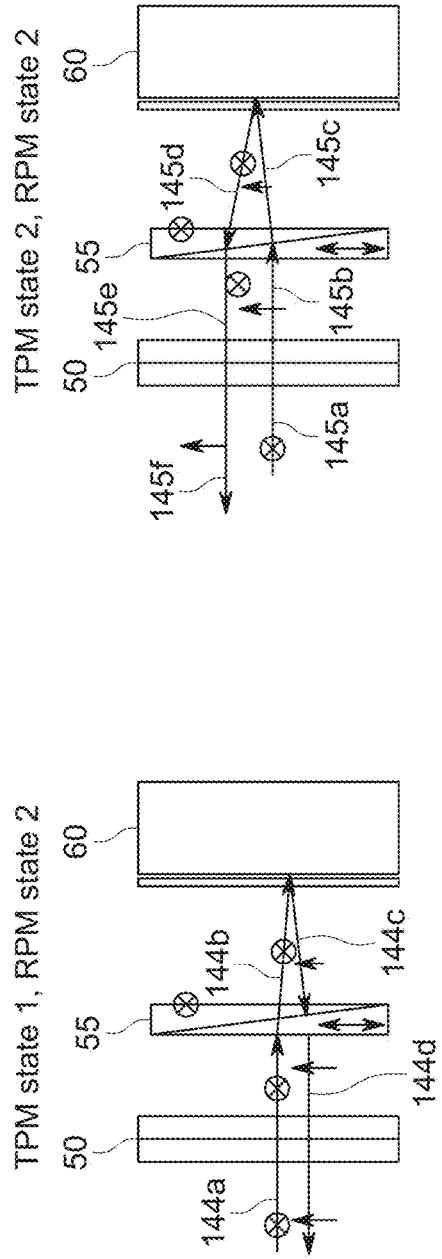
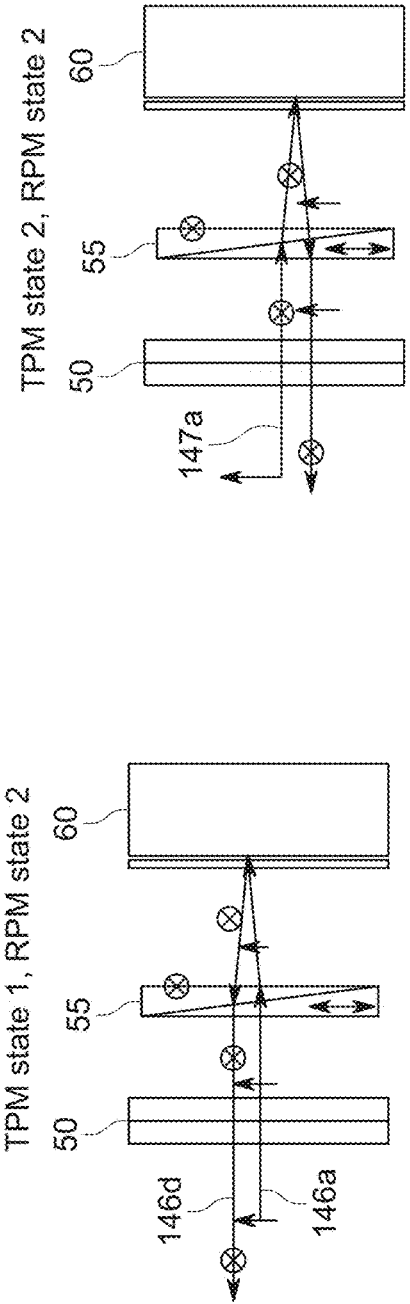
FIG. 16
FIG. 17
FIG. 18
FIG. 19

APPARATUS FOR OPTICAL SWITCHING WITH TRANSMISSIONAL AND REFLECTIVE POLARIZATION MODULATORS

RELATED APPLICATIONS

No claim of priority is made at this time.

TECHNICAL FIELD

This patent disclosure relates generally to wavelength selective switch assemblies and, more particularly, to a wavelength selective switch assemblies incorporating at least one transmissional polarization modulator and a reflective polarization modulator.

BACKGROUND

Optical switches are used in optical communication networks to provide high-speed, high data rate communication capabilities. The optical communication networks often use optical wavelength division multiplexing to maximize the use of the optical spectrum. Wavelength selective switch assemblies permit optical signals to be selectively switched between optical receivers to carry out the desired communications functionality.

As system capable of directing specific wavelengths to various ports of the wavelength selective switch, including dropping and adding wavelengths, in the most efficient and flexible manner possible would be desirable.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a wavelength selective switch includes a plurality of optical ports, a polarization conditioning system, a dispersion system, and a switching system. At least one of the optical ports is configured to receive an input optical beam having a plurality of wavelength channels, and one or more of the optical ports is configured to receive and output therethrough one or more wavelength channels of the plurality of wavelength channels of the input optical beam. The polarization conditioning system is configured to separate the input optical beam into first and second optical components. The first optical component has a first polarization and the second optical component has a second polarization orthogonal to the first polarization. The dispersion system is configured to spatially separate the plurality of wavelength channels. The switching system includes at least one transmissive stage and a reflective polarization modulator. Each transmissive stage has a transmissional polarization modulator and a symmetrical beam polarization separator. The transmissional polarization modulator includes a plurality of individually controllable transmissive first cells, with each first cell being configured to independently and selectively change a polarization orientation of an optical beam passing through the cell. The symmetrical beam polarization separator is configured to redirect the optical beam passing therethrough based upon its polarization. The reflective polarization modulator includes a birefringence section and a reflective section. The birefringence section includes a plurality of individually controllable second cells, with each second cell being configured to independently and selectively convert linear polarization of an optical beam passing therethrough to circular polarization and to independently and selectively convert circular polarization of the optical beam passing through the second cell to linear polarization.

In another aspect, a switching system includes at least one transmissive stage and a reflective polarization modulator. Each transmissive stage has a transmissional polarization modulator and a symmetrical beam polarization separator. The transmissional polarization modulator includes a plurality of individually controllable transmissive first cells, with each first cell being configured to independently and selectively change a polarization orientation of an optical beam passing through the cell. The symmetrical beam polarization separator is configured to redirect the optical beam passing therethrough based upon its polarization. The reflective polarization modulator includes a birefringence section and a reflective section. The birefringence section includes a plurality of individually controllable second cells, with each second cell being configured to independently and selectively convert linear polarization of an optical beam passing therethrough to circular polarization and to independently and selectively convert circular polarization of the optical beam passing through the second cell to linear polarization.

BRIEF DESCRIPTION OF THE DRAWINGS

FIG. 16 is a schematic view of the switching array of FIG. 1 with the transmissional polarization modulator in an on state and the reflective polarization modulator in an off state;

FIG. 17 is a schematic view of the switching array of FIG. 1 with both of the transmissional polarization modulator and the reflective polarization modulator in an off state;

FIG. 18 is a schematic view similar to FIG. 16 but with the input beam having an orthogonal polarization;

FIG. 19 is a schematic view similar to FIG. 17 but with the input beam having an orthogonal polarization;

DETAILED DESCRIPTION

Figure 1:
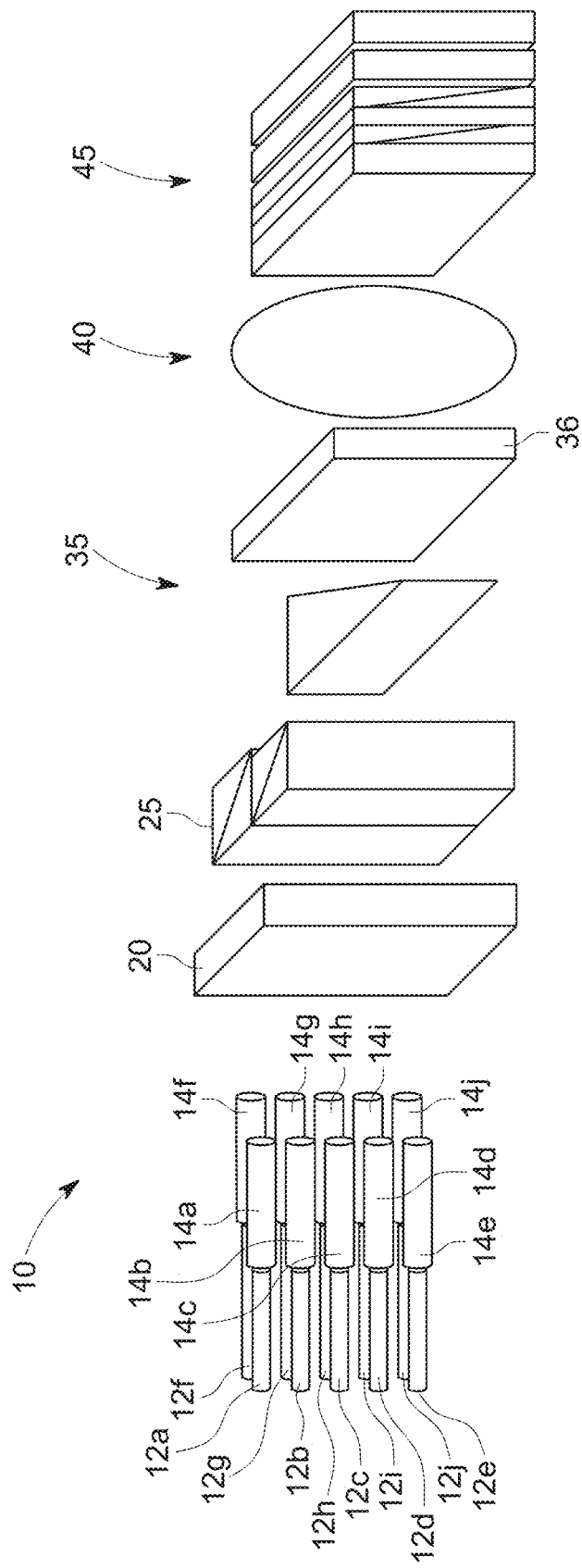
FIG. 1 is a schematic view of an exemplary wavelength selective switch assembly in which the principles of the present disclosure may be incorporated.

An exemplary 1×N wavelength selective switch assembly (WSS) 10 is depicted in FIG. 1. The WSS 10 includes, in sequence, a plurality of optical fibers 12a-12j, a plurality of collimators 14a-14j, a polarization conditioning system such as polarization separating and converting optics 20, a polarization beam splitter system 25, beam expansion optics 30, a dispersion system 35, a lens system 40, and a switching array 45. Each of the collimators 14a-14j, the polarization conditioning system, the polarization beam splitter system 25, the beam expansion optics 30, the dispersion system 35, the lens system 40, and the switching array 45 may be in optical communication with its adjacent components through free space.

Each optical fiber 12a-12j is coupled to a respective one of the collimators 14a-14j and each combination of optical fiber and collimator define one of a plurality of ports. As depicted, two COM ports are shown at 12c and 12h. Other ports 12a-b, 12d-g, 12i-j may operate as drop ports and add ports. In other words, light beams may be received at and discharged from the WSS 10 from any of the optical fibers 12a-12j and the collimators 14a-14j. Although depicted with ten ports, the WSS 10 may include any number of ports.

The input optical beam 101 from one of the collimators 114a-114j may have any random polarization. Such input beam includes two optical components 102, 103 having orthogonal polarization depicted at 104, 105, respectively. Polarization separating and converting optics 20 are provided such as a birefringent walk-off crystal element 21 (FIG. 2) to spatially separate the two optical components 102, 103 of the optical beam 101 as a result of their orthogonal polarizations 104, 105. The illustrated orientations of the polarization states 104, 105 are exemplary only and may have any orientations that are orthogonal. In operation, the first optical component 102 passes through the walk-off crystal 21 without changing its path. The second optical component 103 is redirected along a propagation angle based upon the characteristics of the crystal 21.

A half-wave plate 24 can be aligned with one of the optical components (e.g., 103) along the path of the walk-off crystal 21 and operates to rotate the polarization of the optical component passing therethrough by 90° so that the first and second optical components 102, 103 have the same polarization (e.g., 104).

Figure 2:
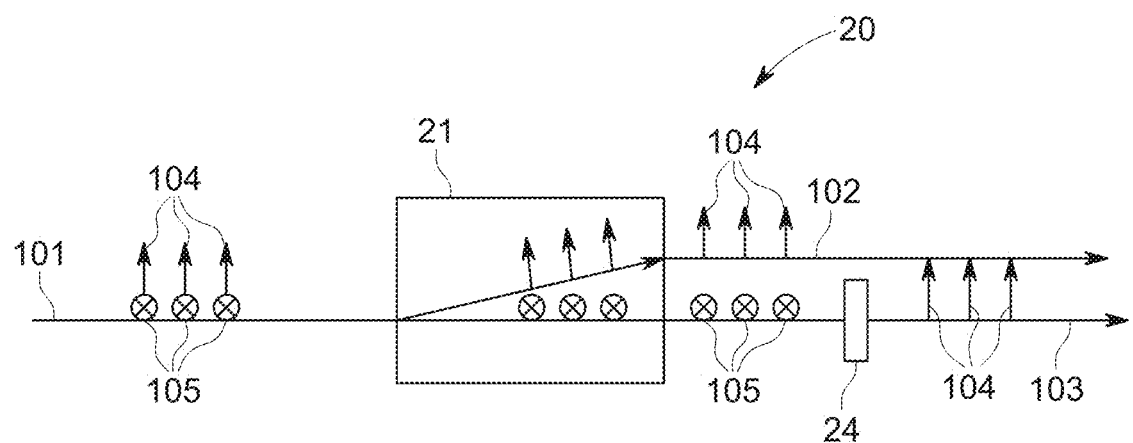
FIG. 2 is schematic view of the polarization separating and converting optics of FIG. 1.
Figure 3:
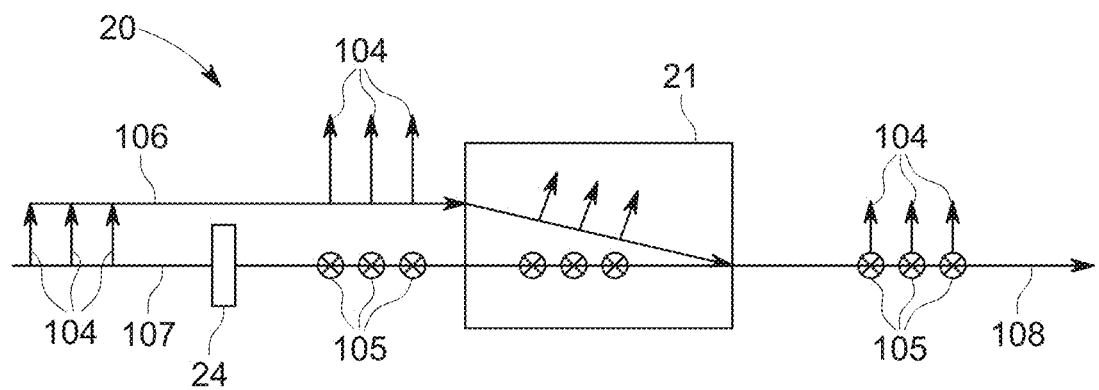
FIG. 3 is schematic view of the polarization separating and converting optics of FIG. 2 but configured to combine light beams.

As depicted in FIG. 3, the birefringent walk-off crystal element 21 and the half-wave plate 24 are bi-directional and thus will change the polarization and combine light beams (e.g., 106, 107) in a manner opposite the separation depicted in FIG. 2 to form a single beam 108.

Figure 4:
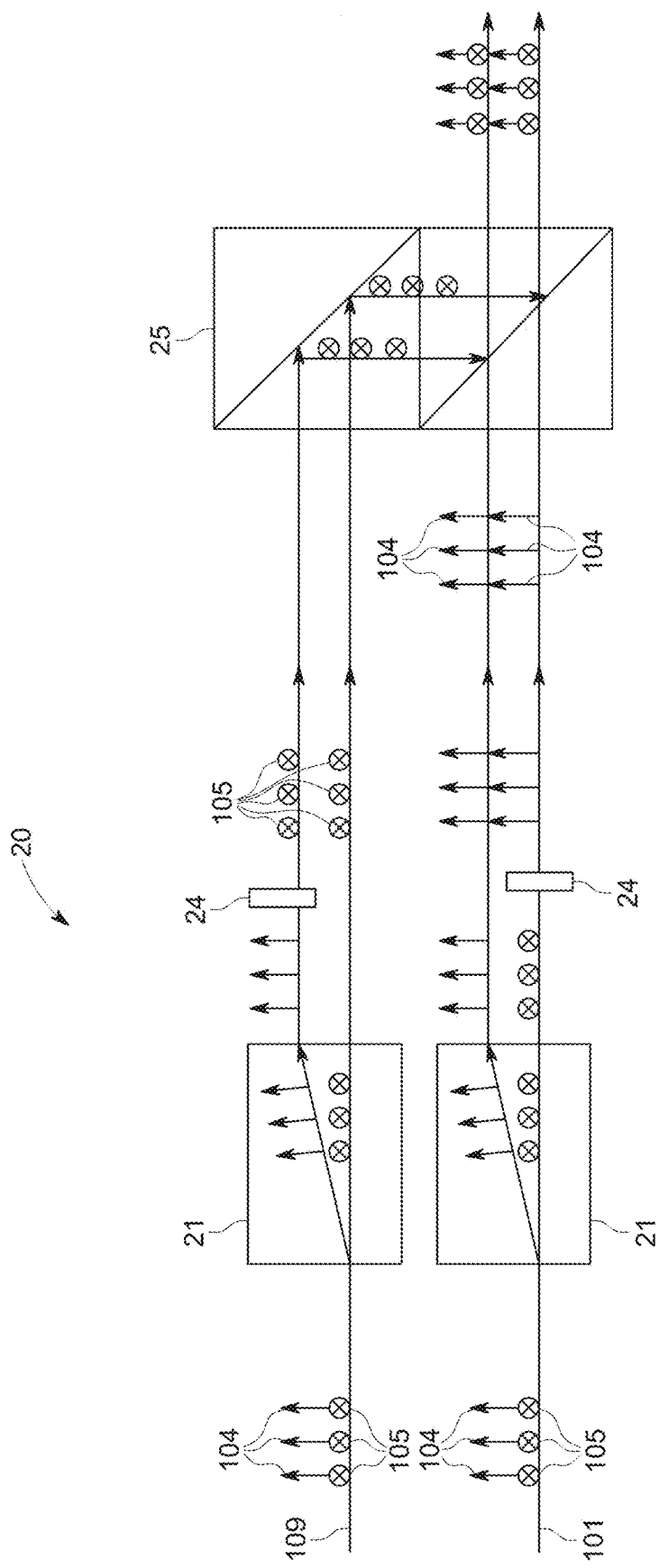
FIG. 4 is a schematic view of the polarization beam splitter system of FIG. 1.

Re-oriented output light beams passing from the polarization separating and converting optics 20 may then pass through the polarization beam splitter system 25. As depicted in FIG. 4, first beam 101 and second beam 109 pass through the polarization separating and converting optics 20. Optical components corresponding to the first polarization orientation 104 of FIG. 2 are reflected by the polarization beam splitter system 25 while the components corresponding to the second polarization orientation 105 of FIG. 2 pass through the polarization beam splitter system. As a result of the configuration of the polarization separating and converting optics 20 and the polarization beam splitter system 25, signals from adjacent ports may be multiplexed together with orthogonal polarizations.

Figure 5:
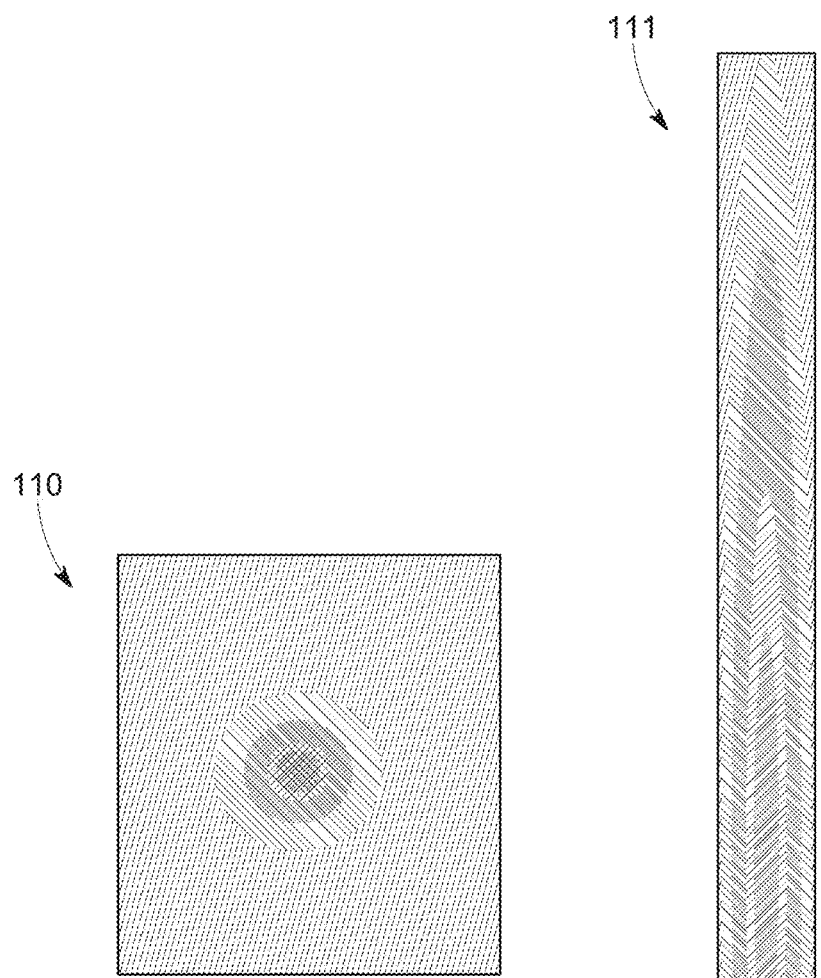
FIG. 5 is a schematic view of an unexpanded light beam.
Figure 6:
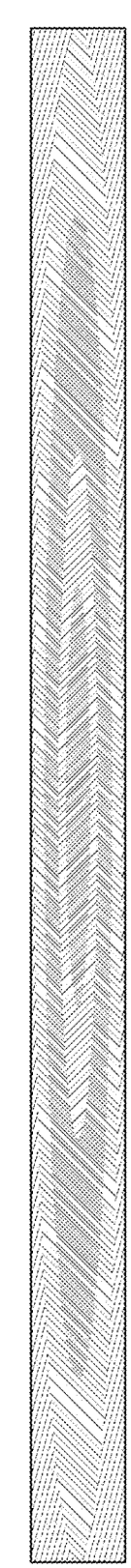
FIG. 6 is a schematic view of the light beam of FIG. 5 expanded in a single direction.

Upon exiting the polarization beam splitter system 25, each light beam is expanded by beam expansion optics 30. The beam expansion optics 30 may be configured to expand the light beams along only one axis or in only one direction (e.g., the "y" direction). FIG. 5 depicts an example of an unexpanded optical beam 110 while FIG. 6 depicts an example of an optical beam 111 expanded in the "y" or vertical dimension.

Each expanded beam 111 is projected onto the dispersion system 35 to spatially (i.e., angularly) separate each of the wavelengths within the light beam. In one embodiment, the dispersion system 35 may be configured as one or more gratings 36. Each wavelength is directed towards the lens system 40, which redirects each wavelength to the switching array 45. The lens system 40 may be configured in any desired manner and is operative to focus each wavelength onto a desired unique location of the switching array.

The switching array 45 includes a plurality of individual switches operative to control and direct the position of each wavelength within the WSS 10. The number of individual switches corresponds to the number of frequencies that the switching array 45 is capable of switching. In one embodiment, the switching array may include ninety-six individual switches. Other numbers of individual switches are contemplated. The switching array comprises one or more transmissive stages 48 and a single reflective polarization modulator 60. More specifically, the switching array 45 has a first end 46 and a second, opposite end 47. The first end 46 is operative as both an input and output to the switching array 45 with optical signals entering and exiting from the first end. The second end 47 includes a reflective component as further described herein.

The switching array 45 includes one or more transmissive stages 48 of paired elements configured as a transmissional polarization modulator 50 and a symmetrical beam polarization separator such as a Wollaston prism 55. The transmissional polarization modulator 50 may be configured with an array of individually controllable liquid crystal elements or switches through which an optical beam may pass. As stated above, the number of individual switches corresponds to the number of frequencies that the switching array 45 is capable of switching. Depending upon the electrical state of each optical switch, the optical beam may pass through the switch unchanged or may pass through the switch with the optical polarization being rotated by a designated amount or extent. In one embodiment, the optical switch may rotate the optical beam by 90°.

In other words, the transmissional polarization modulator 50 may be a liquid crystal optical switch having a plurality of individual switches, each of which is operable in two modes. In the first or "on" mode, which occurs when a threshold or specified voltage is applied to the switch to turn it on, light will pass through the switch without changing the polarization. In a second or "off" mode, which occurs when the threshold or specified voltage is not applied to the switch so it is turned off, light will pass through the switch but the polarization will be rotated by a designated amount such as 90°.

The transmissional polarization modulator 50 may be configured in any desired array. In one embodiment, the transmissional polarization modulator 50 may include 96 distinct or separate cells with each functioning as an individual switch. Each cell of the transmissional polarization modulator 50 corresponds to one of the wavelengths to be switched by or transmitted through the WSS 10. Other configurations of the transmissional polarization modulator 50 as well as other numbers of cells are contemplated.

Figure 7:
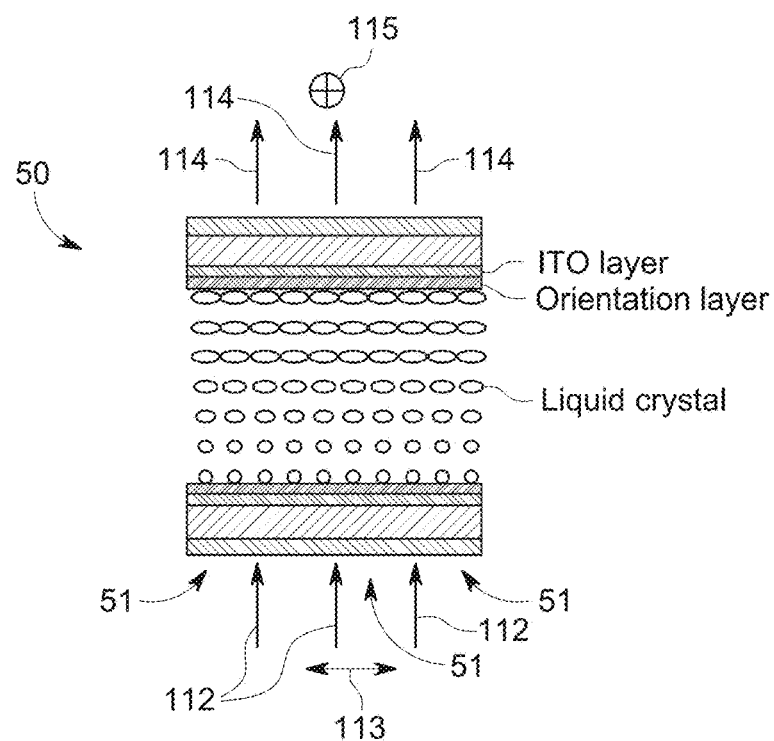
FIG. 7 is a schematic view of a transmissional polarization modulator of the switching array of FIG. 1 in an off or low voltage state.

Referring to FIG. 7, three cells 51 of a transmissional polarization modulator 50 are depicted with each cell in its off state. Input beams 112 each have a polarization according to a first orientation as indicated at 113 enter the transmissional polarization modulator 50. The polarization of the input beams 112 is rotated 90° so that the output beams 114 exit the transmissional polarization modulator 50 with an orthogonal polarization as indicated at 115.

Figure 8:
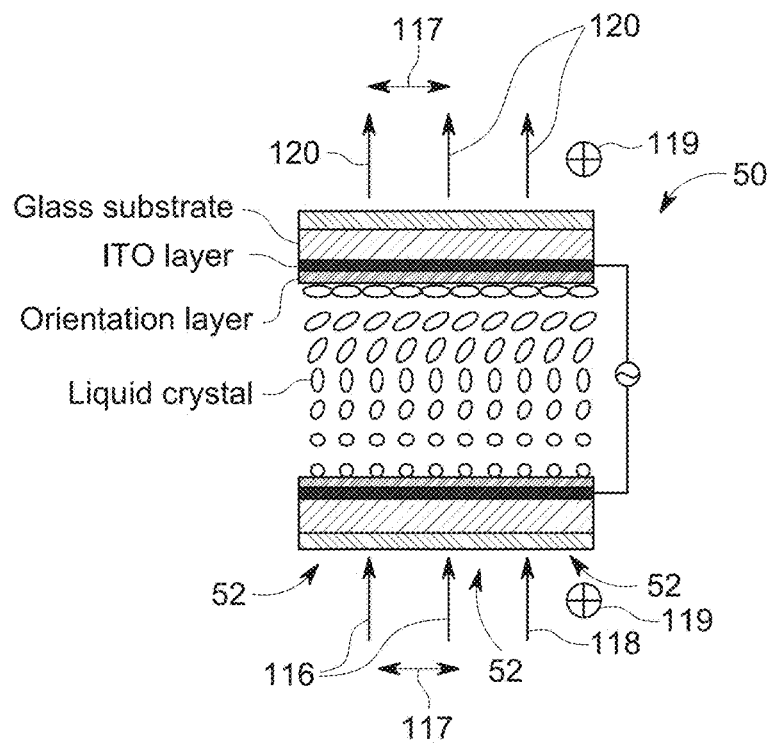
FIG. 8 is the transmissional polarization modulator of FIG. 7 in an on or high voltage state.

In a second example depicted in FIG. 8, each of the cells 52 of the transmissional polarization modulator 50 is depicted in its on state. Two input beams 116 have a polarization according to a first orientation as indicated at 117 and the third input beam 118 has a second, orthogonal polarization as indicated at 119. The polarization of the input beams 116, 118 do not undergo any rotation as they pass through the transmissional polarization modulator 50 so the output beams 120 exit the transmissional polarization modulator with the same polarization.

Figure 9:
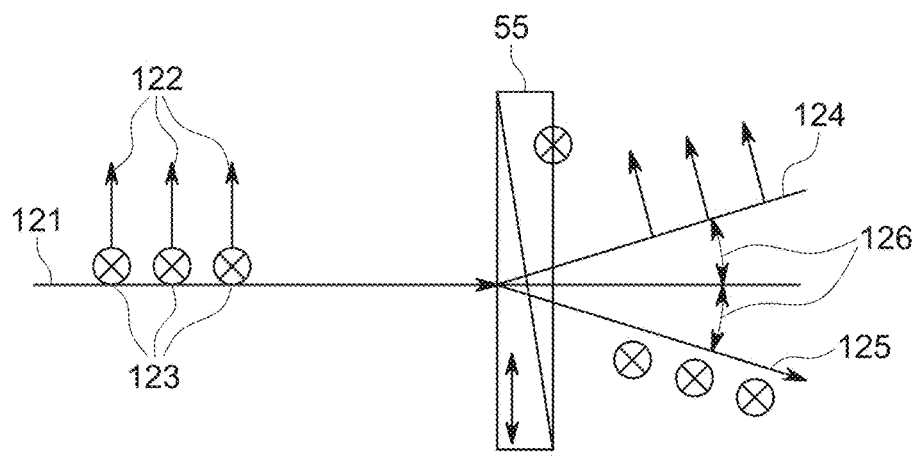
FIG. 9 is a schematic view of the Wollaston prism of the switching array of FIG. 1.

Referring to FIG. 9, the Wollaston prism 55 associated with each transmissional polarization modulator 50 is operative to split a beam of light 121, having two polarization modes 122, 123, into two orthogonally polarized components 124, 125, with each component exiting the prism at a specified angle 126 to the input light beam. One of the polarized components (e.g., 124) is refracted above the input beam by the specified angle 126 and the other (e.g., 125) is refracted below the input beam by the specified angle. The Wollaston prism 55 may be formed by joining two birefringent wedges, such as walk-off crystals, so that their optical axes are orthogonal.

The switching array 45 may include any number of transmissive stages 48 formed of the pairs of transmissional polarization modulators 50 and Wollaston prisms 55. As described below, increasing the number of transmissive stages 48 increases the operability of the WSS 10 to redirect input light beams (as well as the other light beams operative with the WSS) to a greater number of ports.

Figure 10:
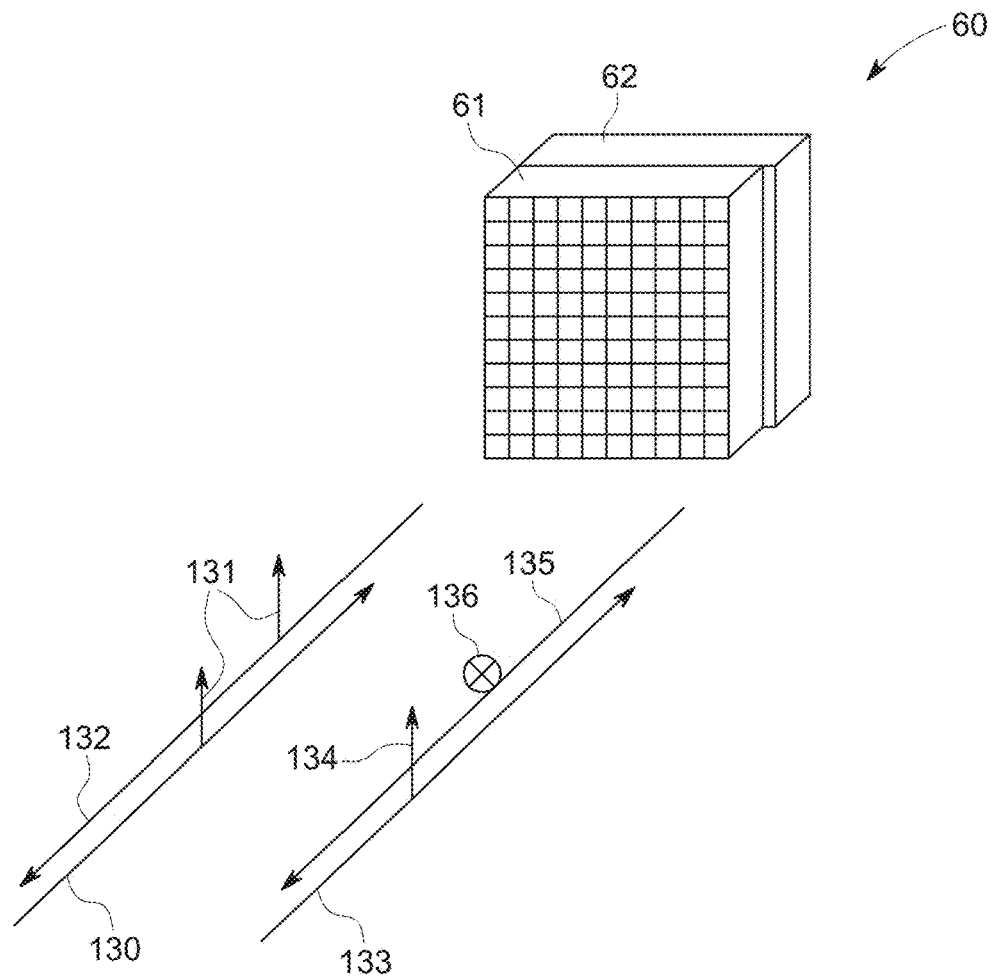
FIG. 10 is a schematic view of a reflective polarization modulator of the switching array of FIG. 1 with examples of both an off or low voltage state and an on or high voltage state.

The reflective polarization modulator 60 depicted in FIG. 10 includes an electrically controlled birefringence section 61 and a reflective section 62, such as a mirror. The electrically controlled birefringence section 61 may be configured with an array of liquid crystal elements or switches identical in number and aligned with those of the transmissional polarization modulator 50. The optical axis of the electrically controlled birefringence structure of each cell of the birefringence section 61 is oriented at a 45° angle relative to an input beam. Depending upon the electrical state of each optical switch, the optical beam may pass through the switch unchanged or may pass through the switch with a change in polarization. The first time the optical signal passes through the birefringence section 61, the optical beam will change from linear polarization to circular polarization. Upon passing through the birefringent section 61 on its return trip, the circular polarization of the optical beam will change to linear polarization.

As with the transmissional polarization modulator 50 described above, the liquid crystal optical switches of the reflective polarization modulator 60 is operative in two modes. In the first or on mode, which occurs when a threshold or specified voltage is applied to the switch to turn it on, light will pass through the switch without changing the polarization. In a second or off mode, which occurs when the threshold or specified voltage is not applied to the switch so it is turned off, light will pass through the switch but the polarization will be rotated by 90° after passing twice through the birefringent layer or section 61.

By coupling the electrically controlled birefringence section 61 with the reflective section 62, a 90° rotation of the polarization may be achieved when desired. More specifically, when the threshold voltage is applied to a switch element so that it is turned on, a light beam 130 will pass through the switch element and be reflected off of the reflective section 62 without rotation of the polarization (as indicated at 131) of the beam as it passes in either direction through the birefringence section 61. Accordingly, the exiting light beam 132 will exit with the same polarization 131 as the input beam 130.

When the threshold voltage is not applied to a switch element so that it is turned off, an input light beam 133 having a first linear polarization as indicated at 134 passing through the switch element towards the reflective section 62 will be changed to circular polarization and then reflected off of the reflective section 62. After the light beam is reflected off of the reflective section 62 as indicated at 135, it will again pass through the birefringence section 61 as it moves away from the second end 47 of the switching array 45 and towards the first end 46. As the light beam 135 passes through the birefringence section 61 a second time before exiting the reflective polarization modulator 60, the circular polarization will again be changed into linear polarization so that the total rotation as a result of the reflective polarization modulator is 90° (as indicated at 136).

Figure 11:
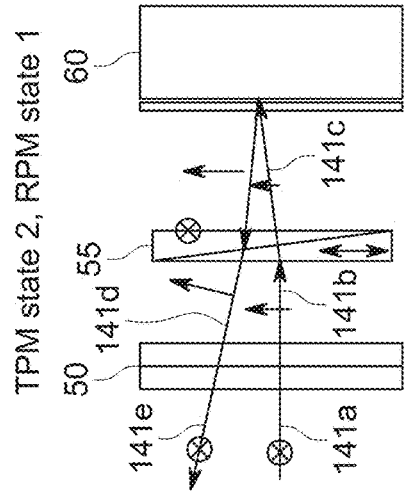
FIG. 11 is a schematic view of the switching array of FIG. 1 with both of the transmissional polarization modulator and the reflective polarization modulator in an on state.

Referring to FIGS. 11-18, a plurality of examples of the operation of an exemplary switching array 45 having a single transmissive stage 48 are depicted. In FIG. 11, a voltage exceeding the threshold is applied (indicated as "state 1" in the drawings) to each of the transmissional polarization modulator 50 and the reflective polarization modulator 60. As a result, the light beam 140*a* passes through the transmissional polarization modulator 50 without changing the polarization. Upon passing through the Wollaston prism 55, the light beam is refracted downward, as indicated at 140*b*, at an angle based upon the angular deviation of the prism.

The light beam 140b passes through the birefringence section 61 of the reflective polarization modulator 60 a first time without a change in polarization, is reflected off of the reflective section 62, and passes through the birefringence section 61 a second time without a change in polarization before exiting the reflective polarization modulator 60. The light beam then passes back through the Wollaston prism 55 and is further refracted downward (as indicated at 140c) at an angle based upon the properties of the prism. As the light beam 140c passes through the transmissional polarization modulator 50 a second time, it does so without a change in the polarization.

As a result of the configuration of the switching array 45, it will be understood that with both the transmissional polarization modulator 50 and the reflective polarization modulator 60 at state 1, the switching array will not change the polarization of the light beam 140a and will change the path of the light beam (e.g., refract it downward) by an amount equal to twice the angular deviation of the Wollaston prism 55.

Figure 12:
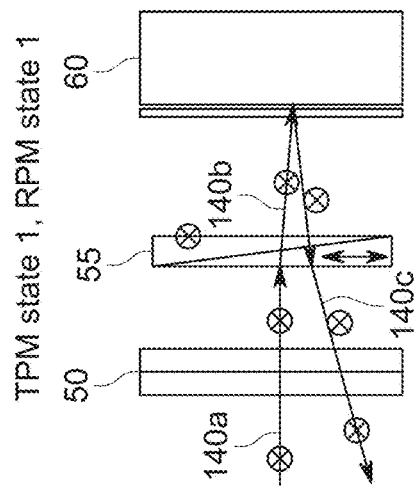
FIG. 12 is a schematic view of the switching array of FIG. 1 with the transmissional polarization modulator in an off state and the reflective polarization modulator in an on state.

In FIG. 12, the reflective polarization modulator 60 is at state 1 while a threshold voltage is not applied (indicated as "state 2" in the drawings) to the transmissional polarization modulator 50. As a result, passing the light beam 141a through the transmissional polarization modulator 50 causes a 90° change in the polarization of the light beam, as indicated at 14 lb. Upon passing through the Wollaston prism 55, the light beam is refracted upward, as indicated at 141c, at an angle based upon the angular deviation of the prism.

The light beam 141c passes through the birefringence section 61 of the reflective polarization modulator 60 a first time without a change in polarization, is reflected off of the reflective section 62, and passes through the birefringence section 61 a second time without a change in polarization before exiting the reflective polarization modulator 60. The light beam then passes back through the Wollaston prism 55 and is further refracted upward, as indicated at 141d, at an angle based upon the angular deviation of the prism. As the light beam passes through the transmissional polarization modulator 50 a second time, the polarization is changed by 90°, as indicated at 141e.

As a result of the configuration of the switching array 45, it will be understood that with the reflective polarization modulator 60 at state 1 and the transmissional polarization modulator 50 at state 2, the switching array 45 will not change the polarization of the light beam (depicted at 141c) but will change the path of the light beam (e.g., refract it upward) by an amount equal to twice the angular deviation of the Wollaston prism 55.

Figure 13:
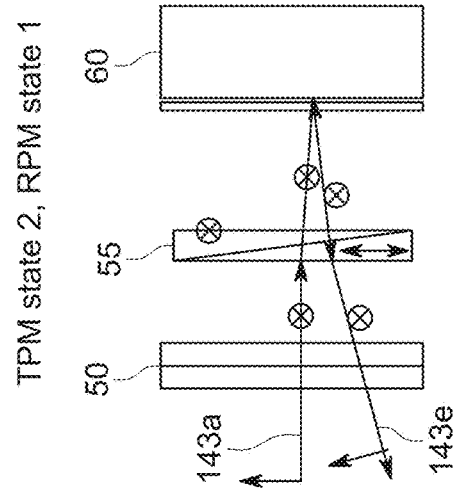
FIG. 13 is a schematic view similar to FIG. 11 but with the input beam having an orthogonal polarization.

Referring to FIG. 13, with both the transmissional polarization modulator 50 and the reflective polarization modulator 60 at state 1 and the light beam 142a having an orthogonal polarization as compared to the light beam 140a in FIG. 11, the switching array 45 will not change the polarization of the light beam 142a and will change the path of the light beam by an amount equal to twice the angular deviation of the Wollaston prism 55 as indicated at 142c. However, based upon the orthogonal polarization, the light beam 142c will be refracted in an opposite direction (e.g., upward) relative to the light beam 140c in FIG. 11.

Figure 14:
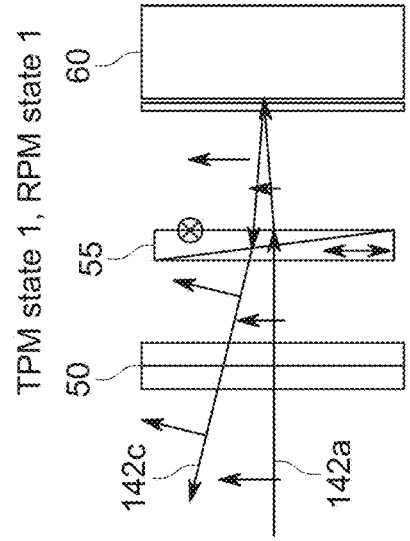
FIG. 14 is a schematic view similar to FIG. 12 but with the input beam having an orthogonal polarization.

Further, referring to FIG. 14, with the reflective polarization modulator 60 at state 1 and the transmissional polarization modulator 50 at state 2 and the light beam 143a having an orthogonal polarization as compared to the light beam 141a in FIG. 12, the switching array 45 will not change the polarization of the light beam and will change the path of the light beam by an amount equal to twice the angular deviation of the Wollaston prism 55 as indicated at 143e. However, based upon the orthogonal polarization, the light beam 143e will be refracted in an opposite direction (e.g., upward) relative to the light beam 141e in FIG. 12.

Based upon the foregoing, it may be understood that a light beam may be redirected upward or downward at an angle to input light within the switching plane (e.g., along the plane of FIGS. 11-14) and without changing the polarization by switching or controlling the status of the transmissional polarization modulator 50 (i.e., between states 1 and 2) while maintaining the reflective polarization modulator 60 at stage 1. In other words, for example, light may be redirected from port 12c to any of ports 12a, 12b, 12d or 12e. by controlling the status of the transmissional polarization modulator 50 while maintaining the reflective polarization modulator at stage 1.

Figure 15:
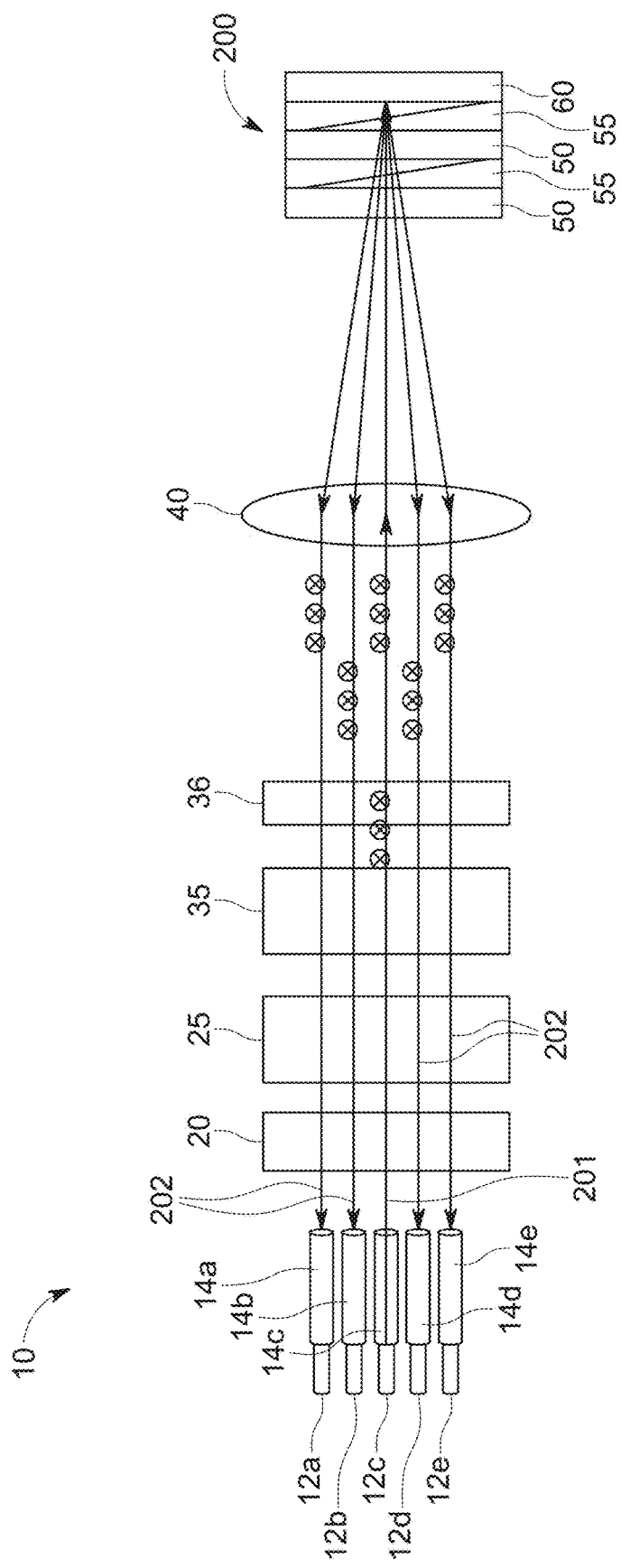
FIG. 15 is a schematic view of the wavelength selective switch assembly of FIG. 1 as viewed along the switching plane.

Referring to FIG. 15, a view of the WSS of FIG. 1 is depicted along the switching plane (i.e., along the plane of the drawing). An input beam 201 from input port 12c can be redirected vertically or within the switching plane to other ports 12a, 12b, 12d or 12e that lie in the same plane as the input port 102c. The alternative paths for the redirected light beam 201 are depicted at 202. It should be noted that the polarization of the light beam 201 does not change while passing through the WSS 10. Further, while the switching array 45 depicted in FIGS. 11-14 has one transmissional polarization modulator 50 and Wollaston prism 55, the switching array 200 of FIG. 15 has a pair of transmissional polarization modulators and Wollaston prisms to permit or facilitate switching of the input beam 201 to the other ports as discussed in further detail below.

In FIG. 16, the transmissional polarization modulator 60 is at state 1 while the reflective polarization modulator 50 is at state 2. As a result, passing the light beam 144a through the transmissional polarization modulator 50 causes no change in the polarization of the light beam. Upon passing through the Wollaston prism 55, the light beam is refracted downward, as indicated at 144b, at an angle based upon the angular deviation of the prism.

As the light beam passes through the birefringence section 61 of the reflective polarization modulator 60 a first time, the polarization is changed to circular polarization and is reflected off of the reflective section 62. As the circular polarized beam passes through the birefringence section 61 a second time, the polarization is changed to linear again and thus is rotated by a total of 90° before exiting the reflective polarization modulator 60. Accordingly, the polarization of the light beam is rotated 90° by the reflective polarization modulator 60, as indicated at 144c. As the light beam passes back through the Wollaston prism 55, it is again refracted but in this instance, upward, as indicated at 144d, at an angle based upon the angular deviation of the prism. As a result, the light beam 144d exits the Wollaston prism 55 below and parallel to the light beam 144b, but with an orthogonal polarization. The light beam passes 144d then passes through the transmissional polarization modulator 50 a second time without a change in the polarization.

As a result of the configuration of the switching array 45, it will be understood that with the transmissional polarization modulator 50 at state 1 and the reflective polarization modulator 60 at state 2, the switching array 45 will not change the angle of the light beam (e.g., refract it upward or downward) but will change the polarization of the light beam. While the light beam 144d exiting the switching array 45 is offset relative to the input light beam 144a, it remains parallel to the input light beam.

In FIG. 17, both the transmissional polarization modulator 50 and the reflective polarization modulator 60 are at state 2. As a result, passing the light beam 145a through the transmissional polarization modulator 50 changes the polarization of the light beam as indicated at 145b. Upon passing through the Wollaston prism 55, the light beam is refracted upward, as indicated at 145c, at an angle based upon the angular deviation of the prism.

As the light beam passes through the birefringence section 61 of the reflective polarization modulator 60 a first time, the linear polarization is changed into circular polarization and is reflected off of the reflective section 62. As the light beam passes through the birefringence section 61 a second time, the circular polarization is converted back to linear polarization before exiting the reflective polarization modulator 60. Accordingly, the polarization of the light beam is rotated 90° by the reflective polarization modulator 60, as indicated at 145d. As the light beam passes back through the Wollaston prism 55, it is refracted upward, as indicated at 145e, at an angle based upon the angular deviation of the prism. As a result, the light beam 145e exits the Wollaston prism 55 above and parallel to the light beam 145b, but with an opposite polarization. The light beam passes then passes through the transmissional polarization modulator 50 a second time with a second change in the polarization as indicated at 145f.

As a result of the configuration of the switching array 45, it will be understood that with both the transmissional polarization modulator 60 and the reflective polarization modulator 50 at state 2, the switching array 45 will not change the angle of the light beam (e.g., refract it upward or downward) but will change the polarization of the light beam and the light beam 145f exiting the switching array 45 is offset relative to the input light beam 145a as compared to the transmissional polarization modulator 60 at state 1 and the reflective polarization modulator 50 at state 2.

Referring to FIG. 18, with the transmissional polarization modulator 50 at state 1 and the reflective polarization modulator 60 at state 2 and the light beam 146a having an orthogonal polarization as compared to the light beam 144a in FIG. 16, the switching array 45 will change the polarization of the light beam in the same, but opposite, manner as FIG. 16 and the light beam 146d exiting will be offset from the input light beam 146a in a direction opposite the light beam 144a.

Further, referring to FIG. 19, with both the transmissional polarization modulator 50 and the reflective polarization modulator 60 at state 2 and the light beam 147a having an orthogonal polarization as compared to the light beam 145a in FIG. 17, the switching array 45 will change the polarization of the light beam in the same, but opposite, manner as FIG. 17 and the light beam 147f exiting will be offset from the input light beam 147a in a direction opposite light beam 145a.

Based upon the foregoing, it may be understood that a light beam may be redirected in a direction parallel to and laterally offset from the switching plane of the input beam while changing the polarization by 90°, by setting the status of the reflective polarization modulator 60 to state 2. In other words, by changing the reflective polarization modulator 60 to state 2, the input light beam from port 12c will be redirected laterally or in the dispersion plane to output port 12h. This will occur regardless of the state of the transmissional polarization modulator 50.

Figure 20:
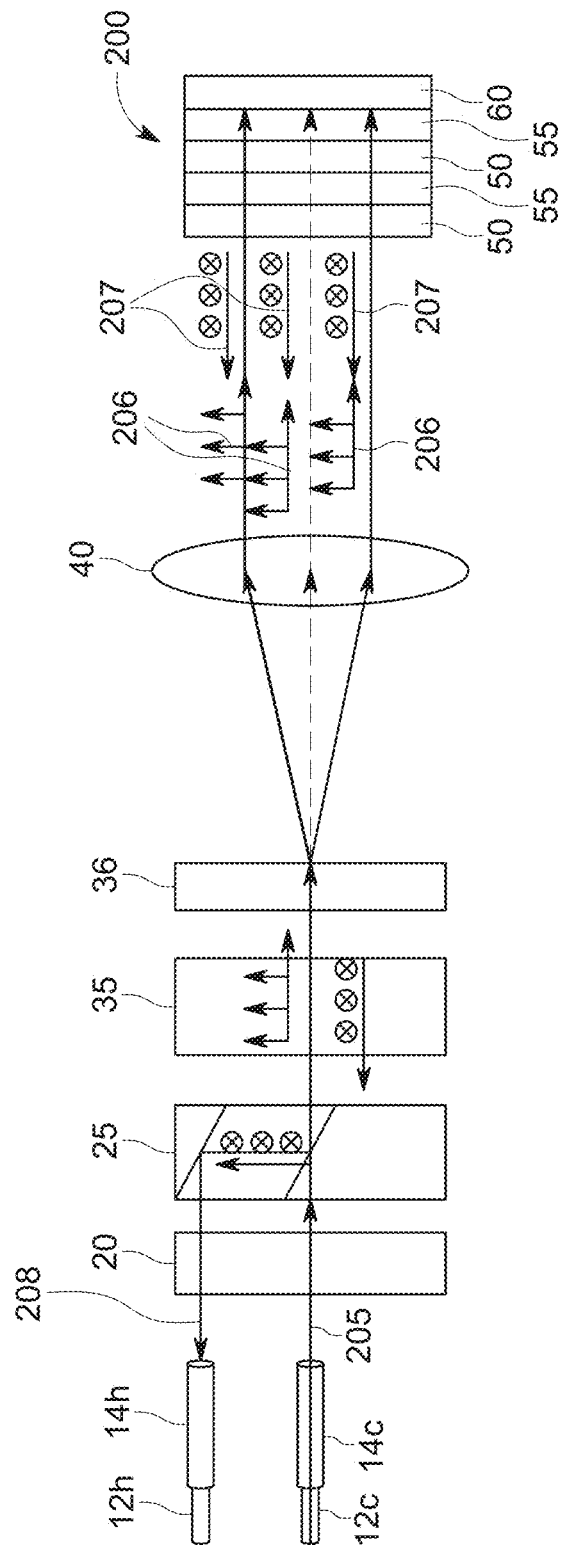
FIG. 20 is a schematic view of the wavelength selective switch assembly of FIG. 1 as viewed along the dispersion plane.

Referring to FIG. 20, a view of the WSS of FIG. 1 is depicted along the dispersion plane, orthogonal to the switching plane of FIG. 15. An input beam 205 from input port 12c is split into different frequencies as depicted at 206 with a first polarization and then redirected by the switching array 45 along the same paths but with an orthogonal polarization as depicted at 207. Upon multiplexing the different frequencies, the polarization beam splitter system 25 will redirect the light beam to the output port 12h as depicted at 208.

Although depicted with a single transmissive stage 48 formed of a transmissional polarization modulator 50 and a Wollaston prism 55, the switching array 45 may include any desired number of transmissive stages. As depicted in FIGS. 11-14 and 16-19, the switching array 45 depicts a single transmissive stage 48 and thus, as depicted in FIG. 21, an input beam 150 may be redirected by the switching array 45 back along the path of the input beam as indicated at 151 or along either of the two angled or diverging paths 152, 153 above and below the input beam.

By increasing the number of transmissive stages 48, the number of ports to which a light beam may be directed may be increased. More specifically, the number of possible exit ports (N) to which a light beam may be directed may be expressed as a function of the number (M) of transmissive stages 48 as follows:

$$N=2^M+1$$

Figure 21:
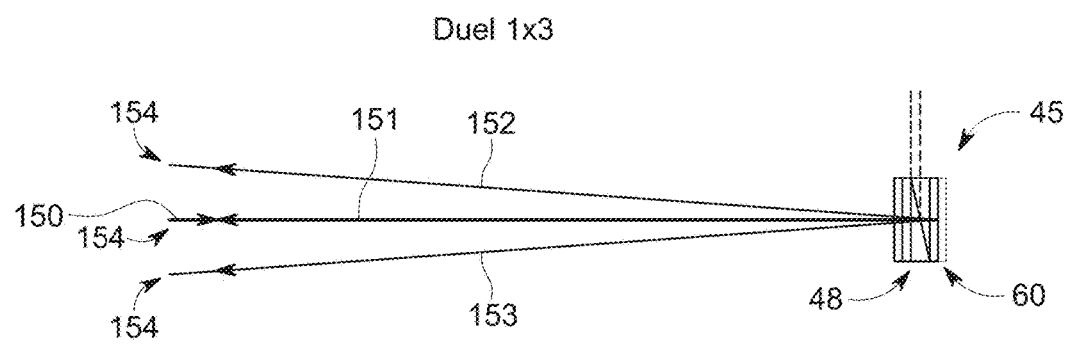
FIG. 21 is a schematic view of the switching array of FIG. 1 with a single transmissive stage.
Figure 22:
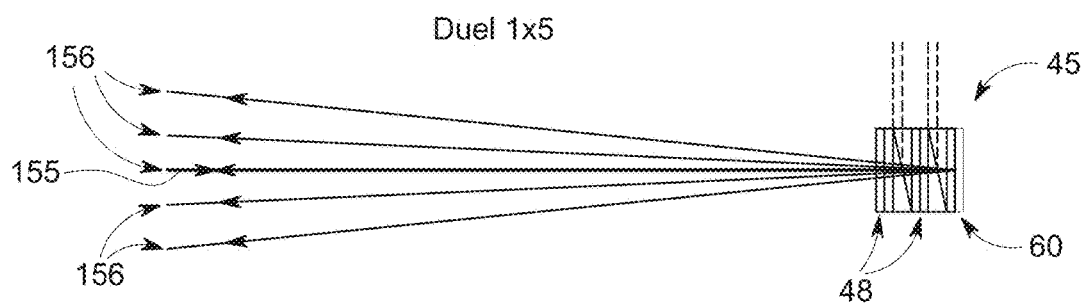
FIG. 22 is a schematic view similar to FIG. 21 but with two transmissive stages.
Figure 23:
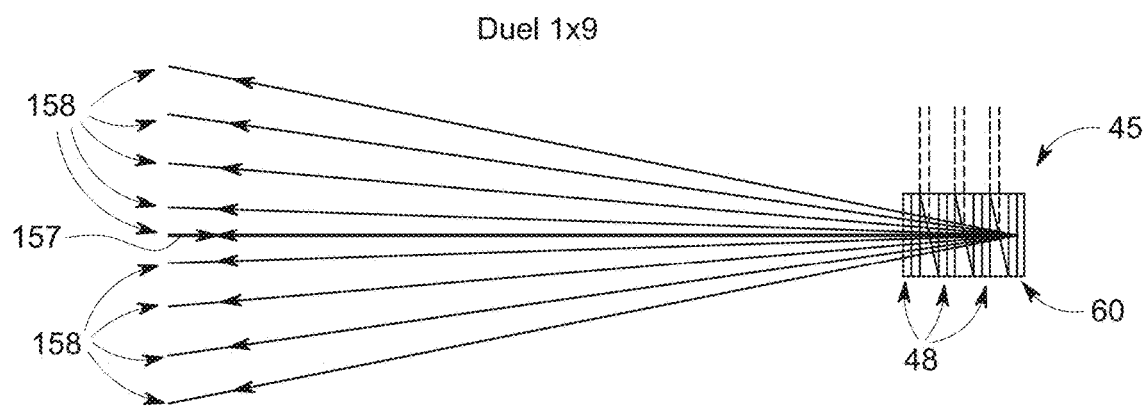
FIG. 23 is a schematic view similar to FIG. 21 but with three transmissive stages.

Accordingly, when using the switching array 45 of FIG. 21 having only a single transmissive stage 48, an input beam 150 may be directed to any of three ports 154. Similarly, when using the switching array 45 of FIG. 22 having two transmissive stages 48, an input beam 155 may be directed to any of five ports 156. As depicted in FIG. 23 in which the switching array 45 has three transmissive stages 48, an input beam 157 may be directed to any of nine ports 158. Accordingly, when used with the example of FIG. 1 having ten optical ports, four transmissive stages 48 will provide the functionality of directing an input beam to the desired optical ports.

Figure 24:
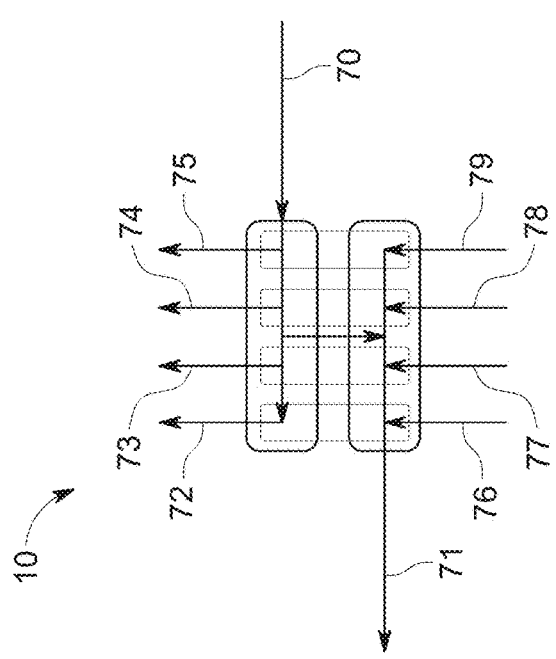
FIG. 24 is a schematic view of the operation of the ports of the wavelength selective switch of FIG. 1 according to a first designation of the ports.
Figure 26:
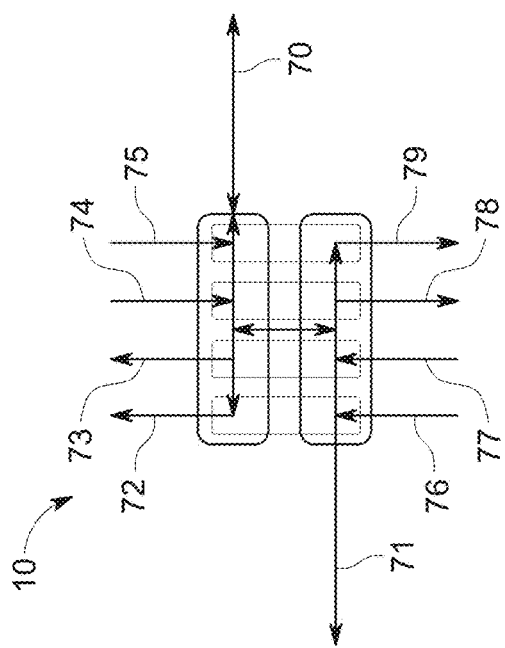
FIG. 26 is a schematic view similar to FIG. 24 according to a third designation of the ports.
Figure 25:
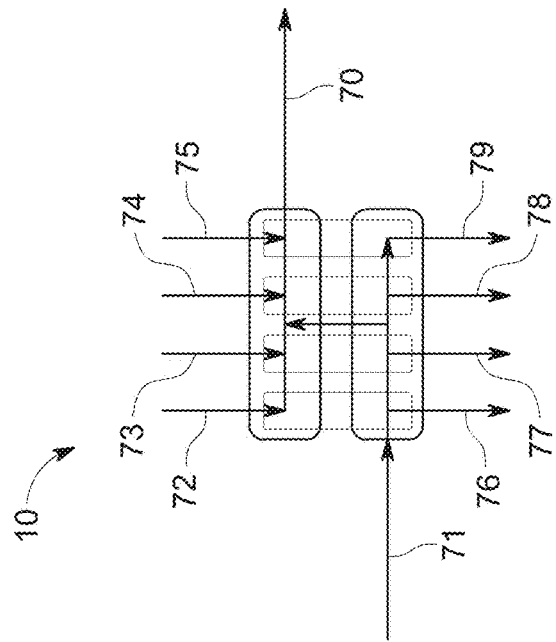
FIG. 25 is a schematic view similar to FIG. 24 according to a second designation of the ports.

The WSS 10 is bi-directional and may be used to receive and process signals in any direction and with the ports having any designation. More specifically, referring to FIG. 24, port 70 may operate as an input port and port 71 as an output port while ports 72-75 operate as drop ports and ports 76-79 operate as add ports. In another embodiment depicted in FIG. 25, which is operable without changing the configuration of the WSS 10, port 70 may operate as an output port and port 71 as an input port while ports 72-75 operate as add ports and ports 76-79 operate as drop ports. Still further, as depicted in FIG. 26, ports 72-73 and ports 78-79 may operate or be designated as drop ports while ports 74-75 and ports 76-77 operate as add ports. In summary, by controlling the operation of the transmissional polarization modulator 50 and the reflective polarization modulator 60, any port may operate as an input port, an output port, a drop port, or an add port without changing the physical configuration of the WSS 10. In addition, one or more wavelengths from the input port can be returned to the input port.

Figure 27:
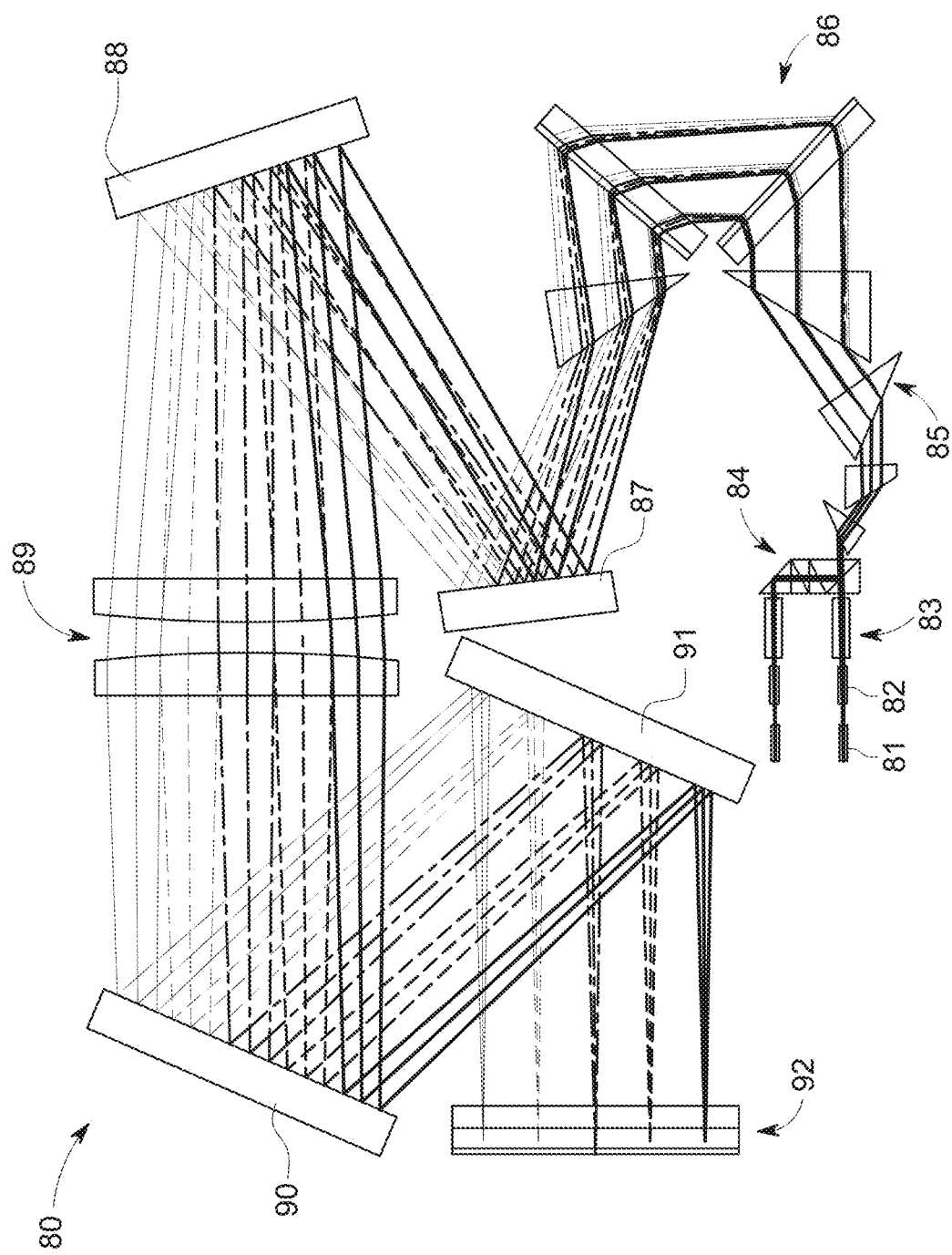
FIG. 27 is a schematic view of a second embodiment of a wavelength selective switch assembly in which the principles of the present disclosure may be incorporated.

An alternative embodiment of a 1×N WSS 80 with folding optics is depicted in FIG. 27. The WSS 80 includes, in sequence, a plurality of optical fibers 81, collimators 82, polarization separating and converting optics 83, a polarization beam splitter system 84, beam expansion optics 85, dispersion system 86, a first folding mirror 87, a second folding mirror 88, lenses 89, a third folding mirror 90, a fourth folding mirror 91, and a switching array 92.

In operation, input light beams may be received at the WSS 110 from one or more of the optical fibers 81 and the collimators 82. The light beams undergo polarization conditioning at the polarization separating and converting optics 83 so that the light beams have the same polarization. The light beams pass through the polarization beam splitter system 84 and are expanded by the beam expansion optics 85 and the dispersion system 86. The expanded light beams are reflected by the first and second folding mirrors 87 and 88 and directed to the lenses 89. The lenses 89 focus the expanded light beams on the third folding mirror 90, which reflects the light beams to the fourth folding mirror 91. The fourth folding mirror 91 directs the light beams onto the switching array 92.

The light beams are redirected and reflected by the switching array 92 and follow a reverse path through the WSS 80 wherein the reverse direction cancels the dispersion and expansion provided by the respective components. The polarization beam splitter system 84 routes particular switched wavelengths towards the collimators 82 associated with the desired port of the WSS 80.

It will be appreciated that the foregoing description provides examples of the disclosed system and technique. However, it is contemplated that other implementations of the disclosure may differ in detail from the foregoing examples. For example, although the embodiments are depicted with a plurality of optical fibers and other optical components, the concepts described herein are applicable to embodiments including only a single optical fiber or optical component at each face of the optical coupling member. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

The invention claimed is:

1. A wavelength selective switch comprising:
a plurality of optical ports, at least one of the optical ports being configured to receive an input optical beam, the input optical beam having a plurality of wavelength channels, and one or more of the optical ports being configured to receive and output therethrough one or more wavelength channels of the plurality of wavelength channels of the input optical beam;
a polarization conditioning system configured to separate the input optical beam into first and second optical components, the first optical component having a first polarization and the second optical component having a second polarization orthogonal to the first polarization;
a dispersion system configured to spatially separate the plurality of wavelength channels; and
a switching system, the switching system including at least one transmissive stage and a reflective polarization modulator, each transmissive stage having a transmissional polarization modulator and a symmetrical beam polarization separator, the transmissional polarization modulator including a plurality of individually controllable transmissive first cells, each first cell being configured to independently and selectively change a polarization orientation of an optical beam passing through the cell, the symmetrical beam polarization separator being configured to redirect the optical beam passing therethrough based upon its polarization, and the reflective polarization modulator including a birefringence section and a reflective section, the birefringence section including a plurality of individually controllable second cells, each second cell being configured to independently and selectively convert linear polarization of an optical beam passing therethrough to circular polarization and to independently and selectively convert circular polarization of the optical beam passing through the second cell to linear polarization.

2. The wavelength selective switch of claim 1, wherein the second cells each have first and second operative states, at the first operative state an optical beam passes through the second cell without a change in polarization and at the second operative state the optical beam changes in polarization as it passes through the second cell, the change in polarization corresponding to changing an optical beam with linear polarization to circular polarization and changing an optical beam with circular polarization to linear polarization, whereby at the second operative state, an optical beam entering the reflective polarization modulator undergoes an orthogonal change in polarization before exiting the reflective polarization modulator.

3. The wavelength selective switch of claim 2, wherein the optical beam undergoes a linear to circular change in polarization, reflects off of the reflective section, and undergoes a circular to linear change and with polarization direction rotated 90° before exiting the reflective polarization modulator.

4. The wavelength selective switch of claim 2, wherein the first cells each have first and second operative states, at the first operative state an optical beam passes through the first cell without a change in polarization and at the second operative state the optical beam passes through the first cell with a 90° change in polarization.

5. The wavelength selective switch of claim 4, wherein the first cells are optically aligned with the second cells.

6. The wavelength selective switch of claim 5, wherein each of the first and second cells are electrically controlled.

7. The wavelength selective switch of claim 1, wherein the first cells each have first and second operative states, at the first operative state an optical beam passes through the first cell without a change in polarization and at the second operative state the optical beam passes through the first cell with a 90° change in polarization.

8. The wavelength selective switch of claim 1, wherein the polarization conditioning assembly is configured to condition the input optical beam such that the first and second optical components have a uniform polarization orientation.

9. The wavelength selective switch of claim 1, further comprising a beam expander optically coupled between the polarization conditioning system and the dispersion system.

10. The wavelength selective switch of claim 1, wherein the transmissional polarization modulator and the reflective polarization modulator each include a liquid crystal cell array.

11. The wavelength selective switch of claim 1, further comprising one or more focusing lenses and one or more folding mirrors optically coupled between the dispersion system and the switching system.

12. The wavelength selective switch of claim 11, wherein at least one of the one or more focusing lenses focuses individual wavelength channels on respective cells of the switching system.

13. The wavelength selective switch of claim 1, wherein at least one of the plurality of optical ports is operative as an add port and at least another of the plurality of optical ports is operative as a drop port.

14. An optical switching system, comprising:
at least one transmissive stage, each transmissive stage having a transmissional polarization modulator and a symmetrical beam polarization separator, the transmissional polarization modulator including a plurality of individually controllable transmissive first cells, each first cell being configured to independently and selectively change a polarization orientation of an optical beam passing through the cell, and the symmetrical beam polarization separator being configured to redirect the optical beam passing therethrough based upon its polarization, and
a reflective polarization modulator, the reflective polarization modulator including a birefringence section and a reflective section, the birefringence section including a plurality of individually controllable second cells, each second cell being configured to independently and selectively convert linear polarization of an optical beam passing therethrough to circular polarization and to independently and selectively convert circular polarization of the optical beam passing through the second cell to linear polarization.

15. The optical switching system of claim 14, wherein the second cells each have first and second operative states, at the first operative state an optical beam passes through the second cell without a change in polarization and at the second operative state the optical beam changes in polarization as it passes through the second cell, the change in polarization corresponding to changing an optical beam with linear polarization to circular polarization conversion and changing an optical beam with circular polarization to linear polarization, whereby at the second operative state, an optical beam entering the reflective polarization modulator undergoes an orthogonal change in polarization before exiting the reflective polarization modulator.

16. The optical switching system of claim 15, wherein the optical beam undergoes a linear to circular conversion in polarization, reflects off of the reflective section, and undergoes a circular to linear change and with polarization direction rotated 90 degree before exiting the reflective polarization modulator.

17. The optical switching system of claim 15, wherein the first cells each have first and second operative states, at the first operative state an optical beam passes through the first cell without a change in polarization and at the second operative state the optical beam passes through the first cell with a 90° change in polarization.

18. The optical switching system of claim 17, wherein the first cells are optically aligned with the second cells.

19. The optical switching system of claim 18, wherein each of the first and second cells are electrically controlled.

20. The optical switching system of claim 14, wherein the first cells each have first and second operative states, at the first operative state an optical beam passes through the first cell without a change in polarization and at the second operative state the optical beam passes through the first cell with a 90° change in polarization.

\* \* \* \* \*